(12) United States Patent
Moghe et al.

(10) Patent No.: US 11,140,730 B2
(45) Date of Patent: Oct. 5, 2021

(54) AUTOMATIC PROVISIONING OF WI-FI CONNECTIONS FOR TRAILERS

(71) Applicant: Cisco Technology, Inc., San Jose, CA (US)

(72) Inventors: Ashok Krishnaji Moghe, Pleasanton, CA (US); John Apostolopoulos, Palo Alto, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 16/354,702

(22) Filed: Mar. 15, 2019

(65) Prior Publication Data
US 2020/0296779 A1    Sep. 17, 2020

(51) Int. Cl.
*H04W 76/14* (2018.01)
*H04B 3/54* (2006.01)
(Continued)

(52) U.S. Cl.
CPC ............ *H04W 76/14* (2018.02); *H04B 3/544* (2013.01); *H04L 41/0816* (2013.01);
(Continued)

(58) Field of Classification Search
CPC ....... H04W 76/14; H04W 48/04; H04W 4/48; H04W 84/12; H04W 48/02; H04W 12/00;
(Continued)

(56) References Cited

U.S. PATENT DOCUMENTS 5,739,592 A * 4/1998 Rigsby .................... B60D 1/62
                                                        280/422
5,905,433 A * 5/1999 Wortham ............... G07C 5/008
                                                        307/9.1
(Continued)

FOREIGN PATENT DOCUMENTS

EP            2760089 B1 * 11/2016    ......... H01R 13/625
WO    WO-2007021418 A3    4/2009
(Continued)

OTHER PUBLICATIONS

"ISO Standards for Trailer Connectors", online: https://en.wikipedia.org/wiki/ISO_standards_for_trailer_connectors, Oct. 25, 2018, Printed Feb. 12, 2019, 9 pages, Wikimedia Foundation, Inc.
(Continued)

*Primary Examiner* — Un C Cho
*Assistant Examiner* — Lalita W Pace
(74) *Attorney, Agent, or Firm* — Behmke Innovation Group LLC; Kenneth J. Heywood; James J. Wong

(57) ABSTRACT

In one embodiment, a device of a tractor unit determines that the tractor unit is connected to a trailer via physical cabling. The device sends, via the physical cabling, a powerline communication (PLC) message to the trailer that includes a service set identifier (SSID) and password for a Wi-Fi transceiver of the tractor unit. The Wi-Fi transceiver of the tractor unit receives an association request sent wirelessly from a Wi-Fi transceiver of the trailer that is based on the sent SSID and password. The device establishes the Wi-Fi
(Continued)

transceiver of trailer as a Wi-Fi client of the Wi-Fi transceiver of the tractor unit.

17 Claims, 8 Drawing Sheets

(51) Int. Cl.
  *H04W 4/48* (2018.01)
  *H04W 48/04* (2009.01)
  *H04L 12/24* (2006.01)
  *H04L 12/26* (2006.01)
  *H04L 29/08* (2006.01)

(52) U.S. Cl.
  CPC .......... *H04L 43/0811* (2013.01); *H04L 43/10* (2013.01); *H04L 67/12* (2013.01); *H04W 4/48* (2018.02); *H04W 48/04* (2013.01)

(58) Field of Classification Search
  CPC ......... H04W 12/00503; H04L 41/0816; H04L 43/10; H04L 43/0811; H04L 67/12; H04B 3/544; H04B 3/54
  See application file for complete search history.

(56) References Cited

U.S. PATENT DOCUMENTS

| | | | | |
|---|---|---|---|---|
| 6,587,041 | B1* | 7/2003 | Brown, Jr. ........... | B62D 53/125 340/431 |
| 7,911,330 | B1* | 3/2011 | Perten ................... | B60Q 1/305 280/DIG. 14 |
| 8,013,759 | B1* | 9/2011 | Aid .......................... | B60D 1/58 303/123 |
| 9,003,492 | B2* | 4/2015 | Katar ................... | H04L 63/0892 726/4 |
| 9,210,575 | B2* | 12/2015 | Lescuyer ............ | H04L 63/1466 |
| 9,531,750 | B2* | 12/2016 | Lawlis ................ | H04L 63/1466 |
| 9,544,075 | B2* | 1/2017 | Altman ................... | H04W 4/80 |
| 9,615,400 | B2* | 4/2017 | Chou ................... | H04W 88/04 |
| 9,665,707 | B2* | 5/2017 | Laifenfeld .............. | G06F 21/44 |
| 2003/0233189 | A1* | 12/2003 | Hsiao ..................... | G01C 21/26 701/521 |
| 2005/0168327 | A1* | 8/2005 | De Wilde ................ | B60D 1/62 340/431 |
| 2006/0091206 | A1* | 5/2006 | Olsen .................... | G06Q 10/08 235/384 |
| 2008/0227411 | A1* | 9/2008 | Martinez ................. | B60D 1/62 455/90.1 |
| 2008/0303648 | A1 | 12/2008 | Day | |
| 2011/0281522 | A1* | 11/2011 | Suda .................. | G06Q 10/0833 455/41.2 |
| 2012/0106527 | A1* | 5/2012 | Ichikawa .............. | H04W 24/02 370/338 |
| 2013/0147617 | A1* | 6/2013 | Boling ................... | G08B 21/18 340/431 |
| 2013/0148748 | A1* | 6/2013 | Suda ....................... | H04B 3/548 375/257 |
| 2014/0081543 | A1 | 3/2014 | Fry | |
| 2014/0211764 | A1* | 7/2014 | Sundararajan ........ | H04W 76/25 370/336 |
| 2016/0023587 | A1 | 1/2016 | Bean | |
| 2016/0052453 | A1* | 2/2016 | Nalepka ................... | B60R 1/00 348/148 |
| 2016/0112216 | A1* | 4/2016 | Sargent .................... | H04L 12/66 370/328 |
| 2016/0234870 | A1* | 8/2016 | Borges ..................... | H04W 4/48 |
| 2016/0381545 | A1* | 12/2016 | Wang .................. | H04W 12/122 455/434 |
| 2017/0063807 | A1* | 3/2017 | Cheng .................... | H04L 63/083 |
| 2017/0088104 | A1* | 3/2017 | Risse ..................... | H04W 76/10 |
| 2017/0111798 | A1* | 4/2017 | Dieckmann ........... | H04L 63/107 |
| 2017/0289254 | A1* | 10/2017 | Dieckmann ............. | H04L 67/12 |
| 2018/0097884 | A1* | 4/2018 | Terwilliger ............. | H04L 67/24 |
| 2018/0124608 | A1* | 5/2018 | Huang .................... | H04W 8/18 |
| 2018/0257616 | A1* | 9/2018 | Mentzendorff .......... | B60T 8/00 |
| 2018/0345952 | A1* | 12/2018 | Layfield ................. | B60L 15/20 |
| 2019/0064835 | A1* | 2/2019 | Hoofard .................. | B60D 1/62 |
| 2020/0184412 | A1* | 6/2020 | Champa ............... | H04B 17/318 |
| 2020/0389927 | A1* | 12/2020 | Lin ......................... | H04W 4/70 |

FOREIGN PATENT DOCUMENTS

| | | | | |
|---|---|---|---|---|
| WO | WO-2016058681 | A1 | 4/2016 | |
| WO | WO2018/166940 | * | 9/2018 | ............ H04W 84/12 |

OTHER PUBLICATIONS

"What Exactly is SAE J560?", Qwik Tech Tips, vol. 3, Issue 7, Jul. 2013, Phillips.

"Tractor Unit", online: https://en.wikipedia.org/wiki/Tractor_unit, Feb. 6, 2019, printed Feb. 12, 2019, 3 pages, Wikimedia Foundation, Inc.

"Trailer Connectors in North America", online: https://en.wikipedia.org/wiki/Trailer_connectors_in_North_America#Heavy_duty_vehicles_-_SAE_J560, Nov. 21, 2018, printed Feb. 12, 2019, 8 pages, Wikimedia Foundation, Inc.

* cited by examiner

AUTOMATIC PROVISIONING OF WI-FI CONNECTIONS FOR TRAILERS

TECHNICAL FIELD

The present disclosure relates generally to computer networks, and, more particularly, to the automatic provisioning of Wi-Fi connections for trailers.

BACKGROUND

In general, the Internet of Things (IoT) refers to the next evolution of computer networking in which many devices that are not traditionally networked are now connected to the Internet, for purposes of remote monitoring, remote control, and enhanced functionality. One example of this expansion of networking capabilities can be found in the shipping and trucking industry, whereby shipping trucks are increasingly being outfitted to communicate via the Internet.

In a typical configuration, the cabin of a tractor unit may include a Wi-Fi access point that communicates with a Wi-Fi client on the trailer, as well as an external interface, such as a cellular connection, that allows the tractor unit to send and receive data via the Internet. Each time a trailer is loaded onto a tractor unit, the connection between the two Wi-Fi networks needs to be established. While a seemingly simple operation, the nature of the trucking industry presents certain hurdles to ensure that the wireless connection between tractor unit and trailer is established correctly. First, there are typically several entities involved in any given transport of a load (e.g., the trailer may be owned by one entity, the payload in the trailer owned by another, and the tractor unit owned by a third entity). Second, the Wi-Fi pairings between trailers and tractor units is also relatively short lived in nature, as the trailer is often disconnected from the tractor unit upon delivery. Third, there are often many tractor units and trailers located at a given warehouse or other location, greatly increasing the potential for a tractor unit Wi-Fi to be paired with the wrong trailer Wi-Fi. For these and other reasons, pairing the networks of a trailer and a tractor unit remain challenging.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1A:
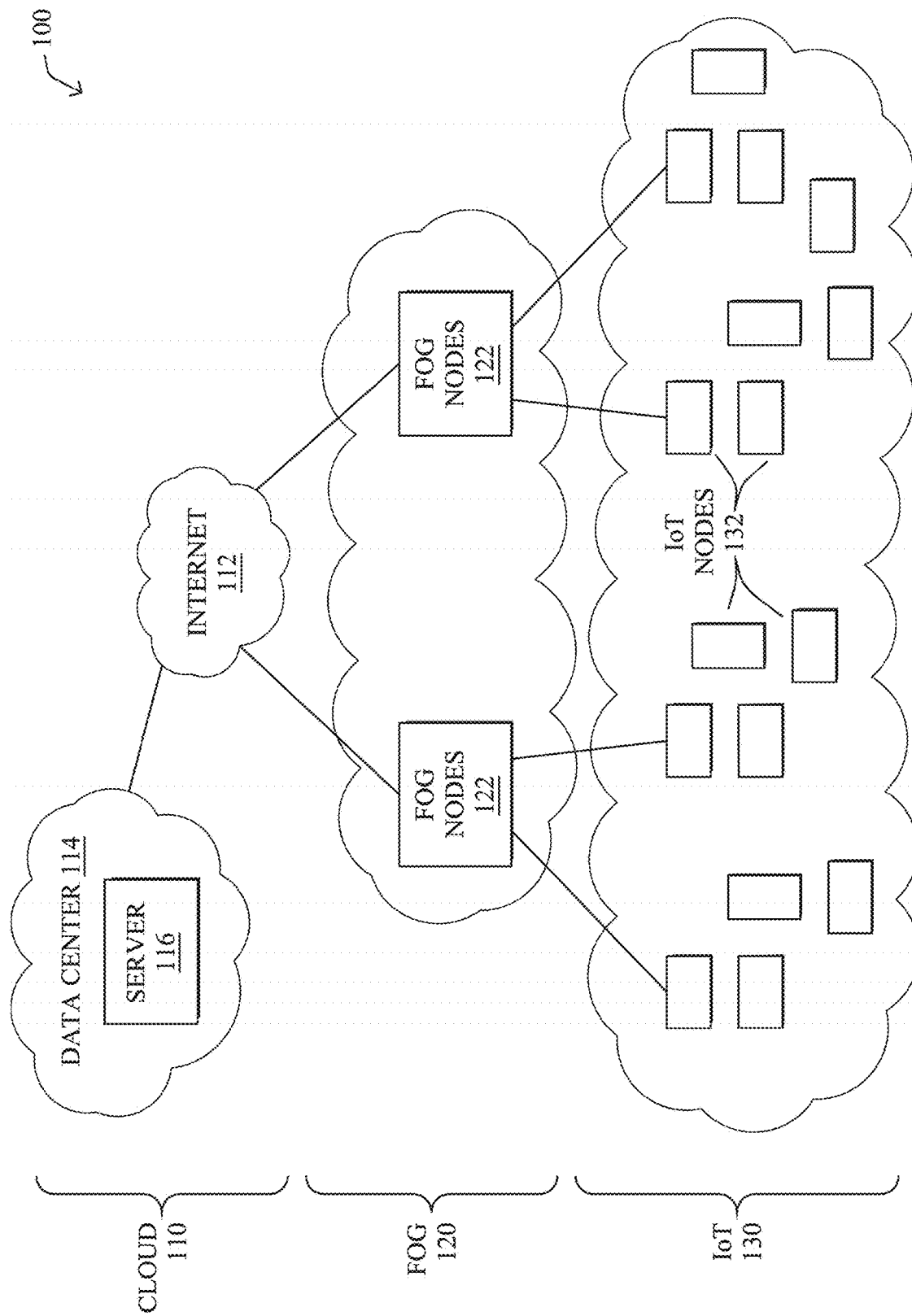
FIGS. 1A-1B illustrate an example communication network.

According to one or more embodiments of the disclosure, a device of a tractor unit determines that the tractor unit is connected to a trailer via physical cabling. The device sends, via the physical cabling, a powerline communication (PLC) message to the trailer that includes a service set identifier (SSID) and password for a Wi-Fi transceiver of the tractor unit. The Wi-Fi transceiver of the tractor unit receives an association request sent wirelessly from a Wi-Fi transceiver of the trailer that is based on the sent SSID and password. The device establishes the Wi-Fi transceiver of trailer as a Wi-Fi client of the Wi-Fi transceiver of the tractor unit.

In further embodiments, a device of a trailer receives, via physical cabling connecting the trailer to a tractor unit, a powerline communication (PLC) message that includes a service set identifier (SSID) and password for a Wi-Fi transceiver of the tractor unit. A Wi-Fi transceiver of the trailer sends an association request to the Wi-Fi transceiver of the tractor unit that is based on the received SSID and password. The Wi-Fi transceiver of the trailer establishes itself as a Wi-Fi client of the Wi-Fi transceiver of the tractor unit. The Wi-Fi transceiver of the trailer sends a wireless communication to the Wi-Fi transceiver of the tractor unit. In turn, the tractor unit transmits the communication via the Internet to a destination.

DESCRIPTION

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC), and others. Other types of networks, such as field area networks (FANs), neighborhood area networks (NANs), personal area networks (PANs), etc. may also make up the components of any given computer network.

In various embodiments, computer networks may include an Internet of Things network. Loosely, the term "Internet of Things" or "IoT" (or "Internet of Everything" or "IoE") refers to uniquely identifiable objects (things) and their virtual representations in a network-based architecture. In particular, the IoT involves the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Often, IoT networks operate within a shared-media mesh networks, such as wireless or PLC networks, etc., and are often on what is referred to as Low-Power and Lossy Networks (LLNs), which are a class of network in which both the routers and their interconnect are constrained. That is, LLN devices/routers typically operate with constraints, e.g., processing power, memory, and/or energy (battery), and their interconnects are characterized by, illustratively, high loss rates, low data rates, and/or instability. IoT networks are comprised of anything from a few dozen to thousands or even millions of devices, and support point-to-point traffic (between devices inside the network), point-to-multipoint traffic (from a central control point such as a root node to a subset of devices inside the network), and multipoint-to-point traffic (from devices inside the network towards a central control point).

Fog computing is a distributed approach of cloud implementation that acts as an intermediate layer from local networks (e.g., IoT networks) to the cloud (e.g., centralized and/or shared resources, as will be understood by those skilled in the art). That is, generally, fog computing entails using devices at the network edge to provide application services, including computation, networking, and storage, to the local nodes in the network, in contrast to cloud-based approaches that rely on remote data centers/cloud environments for the services. To this end, a fog node is a functional node that is deployed close to fog endpoints to provide computing, storage, and networking resources and services. Multiple fog nodes organized or configured together form a fog system, to implement a particular solution. Fog nodes and fog systems can have the same or complementary capabilities, in various implementations. That is, each individual fog node does not have to implement the entire spectrum of capabilities. Instead, the fog capabilities may be distributed across multiple fog nodes and systems, which may collaborate to help each other to provide the desired services. In other words, a fog system can include any number of virtualized services and/or data stores that are spread across the distributed fog nodes. This may include a master-slave configuration, publish-subscribe configuration, or peer-to-peer configuration.

FIG. 1A is a schematic block diagram of an example simplified communication network 100 illustratively comprising nodes/devices at various levels of the network, interconnected by various methods of communication. For instance, the links may be wired links or shared media (e.g., wireless links, PLC links, etc.) where certain nodes, such as, e.g., routers, sensors, computers, etc., may be in communication with other devices, e.g., based on connectivity, distance, signal strength, current operational status, location, etc.

Specifically, as shown in the example network 100, three illustrative layers are shown, namely the cloud 110, fog 120, and IoT device 130. Illustratively, the cloud 110 may comprise general connectivity via the Internet 112, and may contain one or more datacenters 114 with one or more centralized servers 116 or other devices, as will be appreciated by those skilled in the art. Within the fog layer 120, various fog nodes/devices 122 may execute various fog computing resources on network edge devices, as opposed to datacenter/cloud-based servers or on the endpoint nodes 132 themselves of the IoT layer 130. Data packets (e.g., traffic and/or messages sent between the devices/nodes) may be exchanged among the nodes/devices of the computer network 100 using predefined network communication protocols such as certain known wired protocols, wireless protocols, PLC protocols, or other shared-media protocols where appropriate. In this context, a protocol consists of a set of rules defining how the nodes interact with each other.

Those skilled in the art will understand that any number of nodes, devices, links, etc. may be used in the computer network, and that the view shown herein is for simplicity. Also, those skilled in the art will further understand that while the network is shown in a certain orientation, the network 100 is merely an example illustration that is not meant to limit the disclosure.

Figure 1B:
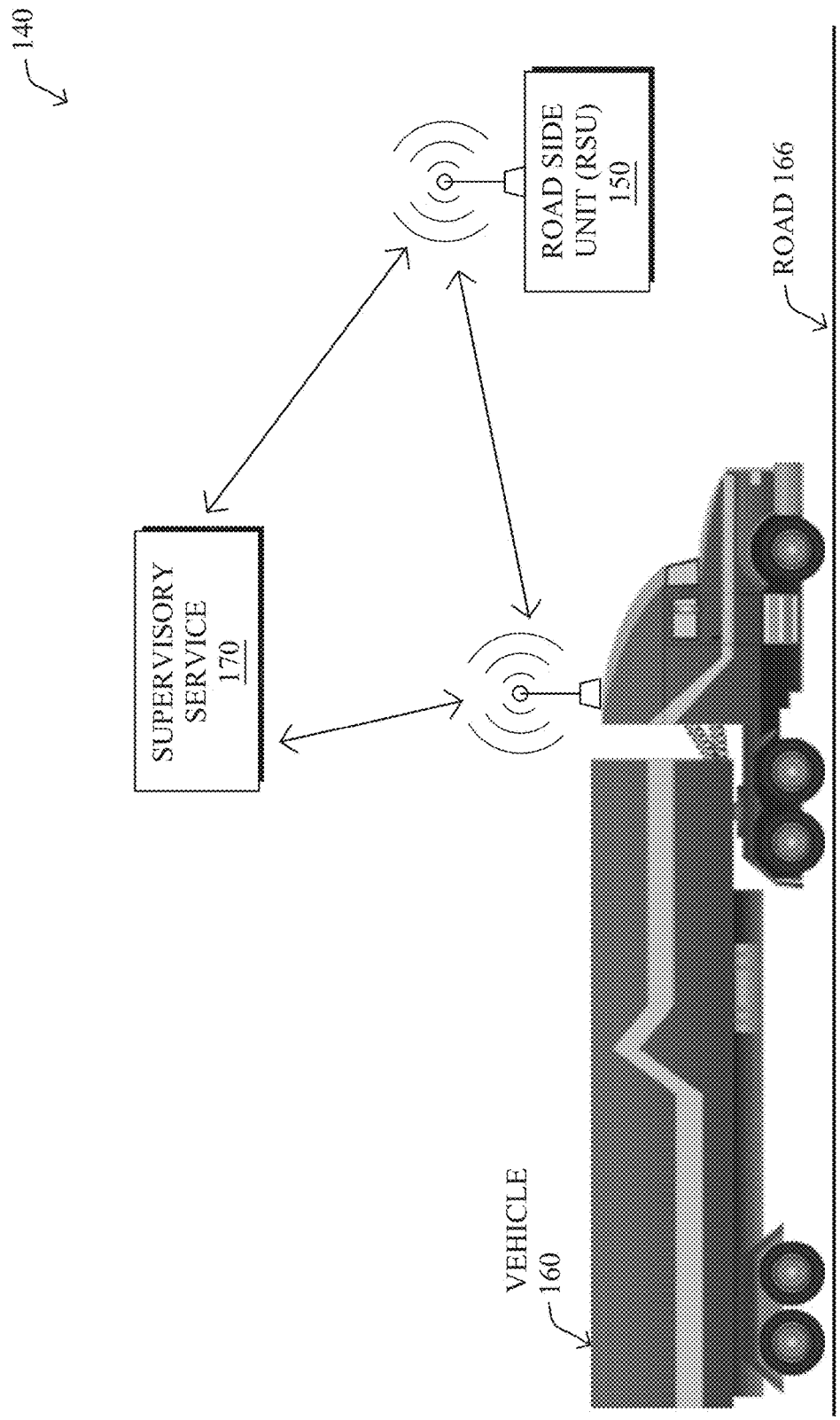

FIG. 1B illustrates an example vehicle communication system 140, according to various embodiments. In particular, vehicle communication system 140 may include any or all of the following components: a vehicle 160, a roadside unit (RSU) 150, and/or a remote supervisory service 170. Generally, vehicle 160 may be any form of vehicle configured to move from one physical location to another such as, but not limited to, cars, buses, trucks, boats, trains, aerial vehicles, and the like. In many cases, vehicle 160 may be configured to transport people and/or cargo. Further, vehicle 160 may be an autonomous vehicle, semi-autonomous vehicle, or manually-operated vehicle, according to the various embodiments herein.

In some embodiments, vehicle communication system 140 may be a specific implementation of communication network 100. Notably, supervisory service 170 may be implemented at the cloud layer 110, such as at a particular server 116 in a data center 114 or, alternatively, across multiple servers 116, such as part of a cloud-based service. Similarly, RSU 150 may be a fog node 122 at fog computing layer 120, while vehicle 160 may be viewed as an IoT node 132 at IoT layer 130. Thus, vehicle 160 may communicate directly with RSU 150, and/or via other IoT nodes 132 (e.g., other vehicles, etc.), and RSU 150 may provide some degree of processing over the communicated data.

RSU 150 may communicate with supervisory service 170 via a WAN, such as the Internet 112 or another WAN. For example, RSU 150 may communicate with supervisory service 170 by leveraging a hardwired network connection, cellular or other wireless connection, satellite connection, or the like. Communications between vehicle 160 and RSU 150 may generally be wireless and use any form of known wireless communication (e.g., Wi-Fi, cellular, light-based, etc.).

As would be appreciated, vehicle 160 may comprise its own local network, to allow the various components of vehicle 160 to communicate with one another. For example, vehicle 160 may comprise any number of sub-networks, such as a Controller Area Network (CAN) bus, an IP network, etc., to allow the various systems of vehicle 160 to communicate with one another. Such system may include, but are not limited to, an engine control unit (ECU), a battery management system (BMS) that manages the local battery of vehicle 160, an advanced driver assistance system (ADAS) system, and the like. A local gateway of vehicle 160 may provide communicative connectivity between the local network of vehicle 160 and other devices. For example, the local gateway of vehicle 160 may provide wireless connectivity to RCU 150 located along road 166 on which vehicle 160 is traveling. In some embodiments, vehicle 160 may also communicate directly with supervisory service 170 via the Internet 112 or another WAN, such as by leveraging a wireless connection to a cellular or satellite-based network.

Figure 2:
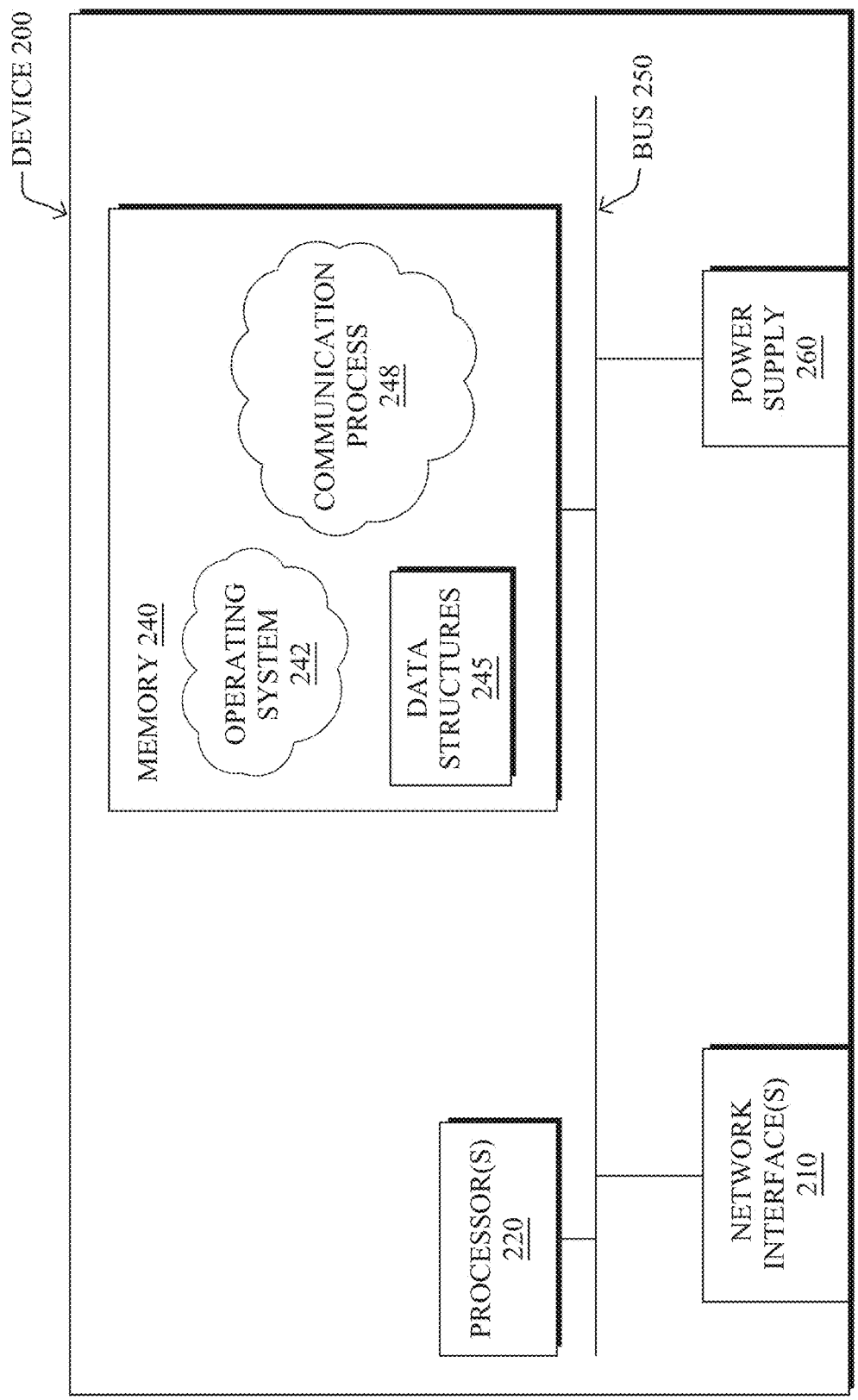
FIG. 2 illustrates an example network device/node.

FIG. 2 is a schematic block diagram of an example computing device/node 200 that may be used with one or more embodiments described herein e.g., as any of the devices shown in FIGS. 1A-1B above or any of the devices described further below. The device may comprise one or more network interfaces 210 (e.g., wired, wireless, cellular, PLC, etc.), at least one processor 220, and a memory 240 interconnected by a system bus 250, as well as a power supply 260 (e.g., battery, plug-in, etc.).

The network interface(s) 210 contain the mechanical, electrical, and signaling circuitry for communicating data over links coupled to the network 100. The network interfaces may be configured to transmit and/or receive data using a variety of different communication protocols. Note, further, that the nodes may have two or more different types of network connections 210, e.g., wireless and wired/physical connections, and that the view herein is merely for illustration. Also, while the network interface 210 is shown separately from power supply 260, for fog modules using PLC, the network interface 210 may communicate through the power supply 260, or may be an integral component of the power supply. In some specific configurations the PLC signal may be coupled to the power line feeding into the power supply.

The memory 240 comprises a plurality of storage locations that are addressable by the processor 220 and the network interfaces 210 for storing software programs and data structures associated with the embodiments described herein. The processor 220 may comprise hardware elements or hardware logic adapted to execute the software programs and manipulate the data structures 245. An operating system 242, portions of which are typically resident in memory 240 and executed by the processor, functionally organizes the device by, among other things, invoking operations in support of software processes and/or services executing on the device. These software processes and/or services may comprise an illustrative communication process 248, as described herein.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

As noted above, the shipping/trucking industry is deploying more and more IoT applications. Many of these applications use a Wi-Fi client on a trailer that is connected to the Wi-Fi access point on the main tractor cabin for data logging and accessing external connection over broadband links, such as a cellular connection. Every time a trailer is connected to a tractor unit, the connection between the two Wi-Fi networks needs to be established. This seemingly simple operation has major logistics issues facing the industry today including, but not limited to, the following:

There are several parties involved in this transaction most of whom have a short-term association with the other parties. For example, the trailer may be owned by one entity, the payload owned by another, and the tractor unit itself owned by a third entity. In addition, the driver may or may not be an actual employee of the truck owner and may be working on a contract basis for certain durations or trips. All this implies sharing credentials required for pairing of the Wi-Fi is neither logistically possible nor desirable.

The Wi-Fi pairings between trailers and tractor units is relatively short-lived in nature. Typically, the truck driver picks up the load (e.g., the loaded trailer) and drives it to the destination. Once there, the trailer is typically disconnected from the tractor unit and the tractor unit is attached to another trailer for the next trip. Unlike a typical wireless device which may have a handful of stored service set identifiers (SSIDs) that it encounters on a frequent basis, the trailer may never get paired with the same tractor unit ever again. This greatly increases the chances that user intervention will be needed to complete the Wi-Fi pairing.

At the docks, warehouses, and other locations where tractor units and trailers are mated, there are often multiple tractor units and trailers within close proximity of one another. This often makes it difficult to identify and associate the correct Wi-Fi networks.

Truck drivers may not be technically adept in configuring Wi-Fi networks.

Typically, trailers are not equipped with user interfaces like keyboards & screens to configure the clients with the proper selection of SSIDs and user credentials, such as passwords.

Given the transient nature of the relationship between truck drivers and trucking companies, trucking companies may not want to share their network details, such as SSIDs and passwords, with drivers. Furthermore, frequently changing the SSIDs and passwords could also increase security, but present a logistical nightmare for the people on the ground, as well.

Automatic Provisioning of Wi-Fi Connections for Trailers

The techniques herein introduce an approach to pairing the Wi-Fi networks of IoT enabled trailers and tractor units in an automated manner. In some aspects, Wi-Fi provisioning can be achieved by leveraging an existing hardwired connection between a trailer and a tractor unit. Indeed, trailers and tractor units today are typically connected using physical cabling, such as a J560 or other cable. The techniques herein propose leveraging these existing cables for purposes of establishing a wireless connection between the two. For example, Wi-Fi provisioning data can be exchanged between a trailer and a tractor unit via Powerline Communications (PLC) messaging over an existing J560 cable that connects the trailer to the tractor unit.

Specifically, according to one or more embodiments of the disclosure as described in detail below, a device of a tractor unit determines that the tractor unit is connected to a trailer via physical cabling. The device sends, via the physical cabling, a powerline communication (PLC) message to the trailer that includes a service set identifier (SSID) and password for a Wi-Fi transceiver of the tractor unit. The Wi-Fi transceiver of the tractor unit receives an association request sent wirelessly from a Wi-Fi transceiver of the trailer that is based on the sent SSID and password. The device establishes the Wi-Fi transceiver of trailer as a Wi-Fi client of the Wi-Fi transceiver of the tractor unit. All of this can be achieved with no user intervention.

Illustratively, the techniques described herein may be performed by hardware, software, and/or firmware, such as in accordance with the communication process 248, which may include computer executable instructions executed by the processor 220 (or independent processor of interfaces 210) to perform functions relating to the techniques described herein.

Operationally, the techniques use an already existing cable and plug design that will be equipped with low speed, low throughput PLC and mechanisms for exchanging Wi-Fi credential and authentication information, to link the Wi-Fi of a trailer to that of a tractor unit. Doing so allows the tractor unit to relay data between the trailer and the Internet via a cellular or other external connection, effectively acting as a hotspot for the trailer.

Figure 3:
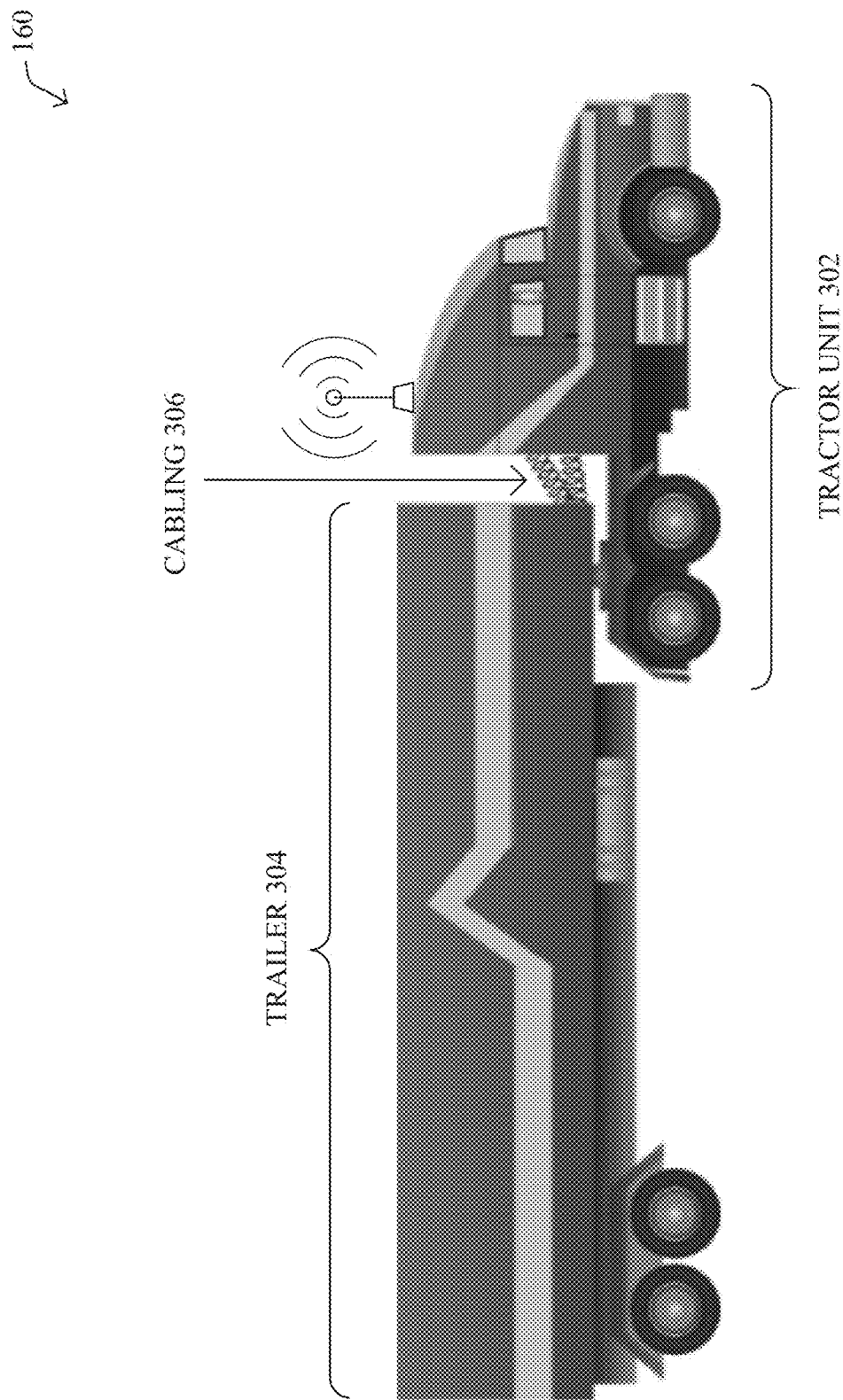
FIG. 3 illustrates an example transportation vehicle.

FIG. 3 illustrates vehicle 160 in greater detail, according to various embodiments. As shown, vehicle 160 may comprise a tractor unit 302 and a trailer 304. During use, trailer 304 may be loaded with cargo for delivery and physically coupled with trailer 304, thereby allowing tractor unit 302 to tow trailer 304 to its destination.

In all cases, physical cabling 306 is also connected between tractor unit 302 and trailer 304 for purposes of controlling the various mechanisms of trailer 304 from tractor unit 302. For example, physical cabling 306 may be used to convey control signals from tractor unit 302 to the turn signals, tail lamps, and license plate lamps of trailer 304. This allows the driver of tractor unit 302 to control the various lighting functions of trailer 304 directly from the cabin of tractor unit 302.

As would be appreciated, there are a number of different standards for the physical cabling between tractor units and trailers. In general, these typically fall within two common categories: 7-pin and 13-pin connectors. However, other standards provide for 5 pin and 15 pin connectors, for commercial trucks. Non-commercial trucks may use other standards that utilize 4, 5, or 6 pin connectors. A non-exhaustive listing of standards that can be used in conjunction with the techniques herein is as follows:

International Standards Organization (ISO) standard 11446 for 13-pin connectors.
ISO standard 7638-2 for 7-pin connectors.
ISO standard 1724 for 7-pin, Type 12N connectors.
ISO standard 3732 for 7-pin, Type 12S connectors.
ISO standard 1724 for 5-pin connectors.
ISO standard 12098 for 15-pin connectors.
ISO standard 7638-1 for 7-pin trailer connectors.
ISO standard 1185 for 7-pin, Type 24N connectors.
ISO standard 3731 for 7-pin, Type 24S connectors.

Generally speaking, the differences between the various connector standards lies in the amount of voltage conveyed and the trailer features that are controlled. For example, different cabling standards may convey 12V of electricity, which is the most common voltage, although other standards provide for the use of 6V or 24V. Similarly, while most cabling standards provide for the control over the turn signals and tail lights of the trailer, other cabling standards also allow for the control over the anti-lock braking (ABS) mechanism, rear fog lamps, brake wear indicators, etc. of the trailer.

In North America, the most common form of cabling between a trailer and tractor unit follows the Society of Automotive Engineers (SAE) J560 standard. Physically, J560 connectors follow the ISO 1185 standard, but J560 requires the use of 12V and higher currents than the 24V called for in the ISO standard. More specifically, the J560 standard specifies the following line/pin configuration:

TABLE 1

| Pin | Signal | Color |
|---|---|---|
| 1 | Ground | White |
| 2 | Lamps - clearance, marker lamps, identification lamps | Black |
| 3 | Left Turn Signal | Yellow |
| 4 | Stop Lamps | Red |
| 5 | Right Turn Signal | Green |
| 6 | Tail Lamps, License Plate Lamps | Brown |
| 7 | ABS brakes, Auxiliary Equipment | Blue |

Figure 4:
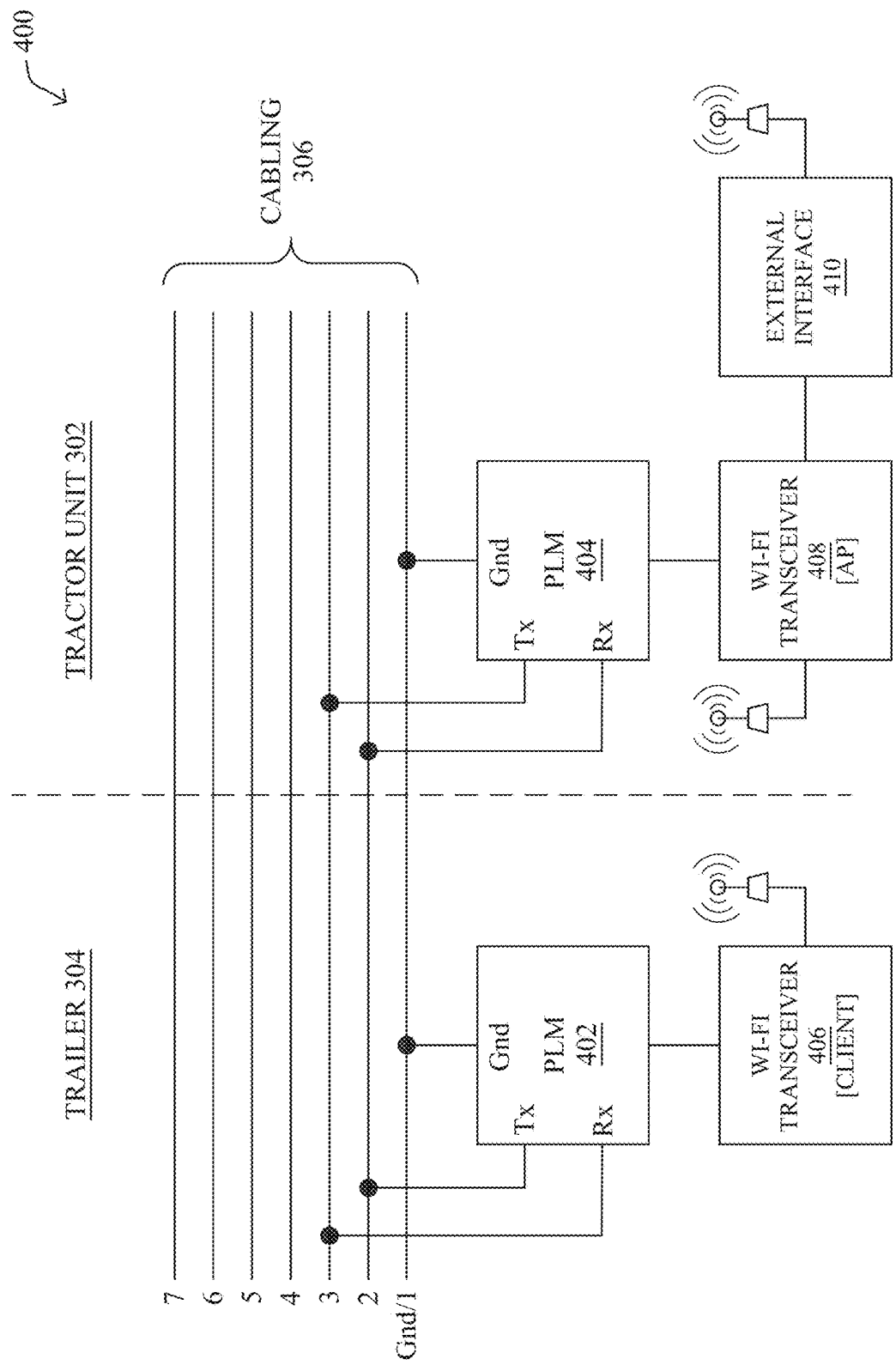
FIG. 4 illustrates an example architecture for automatically provisioning a Wi-Fi connection for a trailer.

FIG. 4 illustrates an example architecture 400 for automatically provisioning a Wi-Fi connection for a trailer, according to various embodiments. For purpose of illustrating the techniques herein, cabling 306 is shown with seven pins/wires, such as in accordance with the J560 standard. However, as would be appreciated, the techniques herein are not limited as such and can be used with any of the various standards for wiring a trailer to a tractor unit.

As noted above, trailer 304 and tractor unit 302 may each be equipped with a Wi-Fi transceiver such as Wi-Fi transceivers 406 and 408, respectively. More specifically, Wi-Fi transceiver 406 of trailer 304 may attach itself as a client to Wi-Fi transceiver 408 of tractor 302, which functions as a Wi-Fi access point. Also located on tractor unit 302 may be an external interface 410 communicatively coupled to Wi-Fi transceiver 408 to allow tractor unit 302 to communicate externally. For example, external interface 410 may comprise a cellular or satellite transceiver. Thus, Wi-Fi transceiver 408 of tractor unit 302 may relay communications between Wi-Fi transceiver 406 of trailer 304 and the Internet. For example, Wi-Fi transceiver 406 may send sensor data from sensors located on trailer 304 to an Internet-based monitoring service (e.g., temperature readings from a refrigerated trailer, etc.).

According to various embodiments, trailer 304 and tractor unit 302 may also be equipped with its own PLC module (PLM), such as PLM 402 and PLM 404, respectively. As shown, PLMs 402 and 404 may be coupled to a plurality of the wires of cabling 306, such as the ground wire, and wires 2-3 shown. More specifically, the transmit (Tx) port of PLM 402 may be coupled with the receive (Rx) port of PLM 404 via wire 2 and the receive port of PLM 402 may be coupled with the transmit port of PLM 404 via wire 3, and both of PLMs 402, 404 coupled to the ground wire of cabling 306. Of course, other wires of cabling 306 could be used to couple PLM 402 and PLM 404, as desired.

As would be appreciated, Wi-Fi transceiver 406 and PLM 402 may be implemented as a single unit or as separate units in communication with one another. Similarly, Wi-Fi transceiver 408 and PLM 404 may be implemented as a single unit or as separate units in communication with one another. In the separate unit case, both the PLM and Wi-Fi transceiver may be viewed as a single device/apparatus, for purposes of the teachings herein.

To connect Wi-Fi transceiver 406 of trailer 304 as a client of Wi-Fi transceiver 408 of tractor unit 302, architecture 400 may operate as follows:
1. When cabling 306 is connected and tractor unit 302 started, Wi-Fi transceiver 408 may send SSID and password information to PLM 404.
2. PLM 404 transmits the SSID and password information to PLM 402 via cabling 306.
3. On trailer 304, PLM 402 receives the SSID and password information for Wi-Fi transceiver 408 and passes this information on to Wi-Fi transceiver 406.
4. Wi-Fi transceiver 406 uses the provided SSID and password information to send an association request to Wi-Fi transceiver 408, to wirelessly establish itself as a client of Wi-Fi transceiver 408.
5. In some embodiments, as an additional security measure, Wi-Fi transceiver 406 may send its ID information, such as the MAC address of Wi-Fi transceiver 406, back to Wi-Fi transceiver 408 via PLMs 402-404. In turn, Wi-Fi transceiver 408 can use the provided ID to prevent other devices (e.g., spoofing devices) from joining the Wi-Fi network of tractor unit 302.

Once Wi-Fi transceiver 406 is connected wirelessly with Wi-Fi transceiver 408, Wi-Fi transceiver 406 can then leverage the high bandwidth connection of external interface 410 to pass data to and from the Internet.

Of note is that the above mechanisms also increase security over existing pairing approaches, as Wi-Fi transceiver 408 of tractor unit 302 can opt to block any other Wi-Fi transceivers as clients whose MAC addresses do not match that of Wi-Fi transceiver 406 transmitted in step 5 above.

Wi-Fi transceiver 408 may disconnect Wi-Fi transceiver 406 as a client under any or all of the following scenarios:
Tractor unit 302 is turned off.
Cabling 306 is disconnected.
A request to decouple Wi-Fi transceivers 406-408 is received (e.g., via the Internet, via a user interface, etc.).

As would be appreciated, the above procedures can also be repeated, to re-establish Wi-Fi transceiver 406 as a client of Wi-Fi transceiver 408. For example, if Wi-Fi transceiver 406 was disconnected as a result of the driver of tractor unit 302 shutting off the truck and turning the truck back on, this may automatically initiate re-establishment of the pairing, on detection of cabling 306 still being connected.

In some cases, once Wi-Fi transceiver 406 is established as a client of Wi-Fi transceiver 408, PLC communications between PLMs 402 and 404 may be disabled. In doing so, the communication over cabling 306 only occurs when the truck is turned on and all the systems are initialized (e.g., the engine of tractor unit 302 starts, power is supplied to trailer 304 to start its lights, etc.) and turns off quickly after initialization. This can be performed on the order of seconds, meaning that the PLC communications will not pose a safety concern by interrupting functioning of the lights and other components of trailer 304 while driving.

Detection of the connection of cabling 306 between tractor unit 302 and trailer 304 can be achieved in a number of ways. In some embodiments, a connector of cabling 306 may be configured with a mechanical or magnetic switch that is activated when plugged into its corresponding connector. In such cases, the state of the switch can be used to determine that cabling 306 is coupled to both tractor unit 302 and to trailer 304. In further embodiments, the connectors of cabling 306 can be outfitted with near field communication (NFC) hardware that detects the coupling of tractor unit 302 and trailer 304 via cabling 306. In further embodiments, PLMs 402-404 may also regularly exchange keepalive packets, to detect the presence of a physical connection via cabling 306.

In some embodiments, whenever a new connection via cabling 306 is detected and Wi-Fi transceiver 406 provides its ID information back to tractor unit 302, tractor unit 302 may use external interface 410 to report this ID to an Internet-based service. Such reporting may also include GPS location and/or timestamp information that can be used by the service for any or all of the following:
For an initial connection, the service can verify that tractor unit 302 is at a known GPS location (e.g., a warehouse or pickup point), to ensure the pairing happened at a valid location.
To perform analytics or other recordkeeping, the service can also record the initial pairing between tractor unit 302 and trailer 304. Such information is valuable to answer whether the truck driver picked up the load on schedule.
If the GPS location is not an expected location of pairing, the service can generate an alert. For example, if the switch is not at an expected location, this can indicate a potential robbery or breakdown.
In cases where the ID of trailer 304 does not match the expected ID, the service can also generate an alert to the truck driver, as this may indicate that the driver picked up the wrong load. This can greatly reduce costly and time-consuming mistakes.

Figure 5:
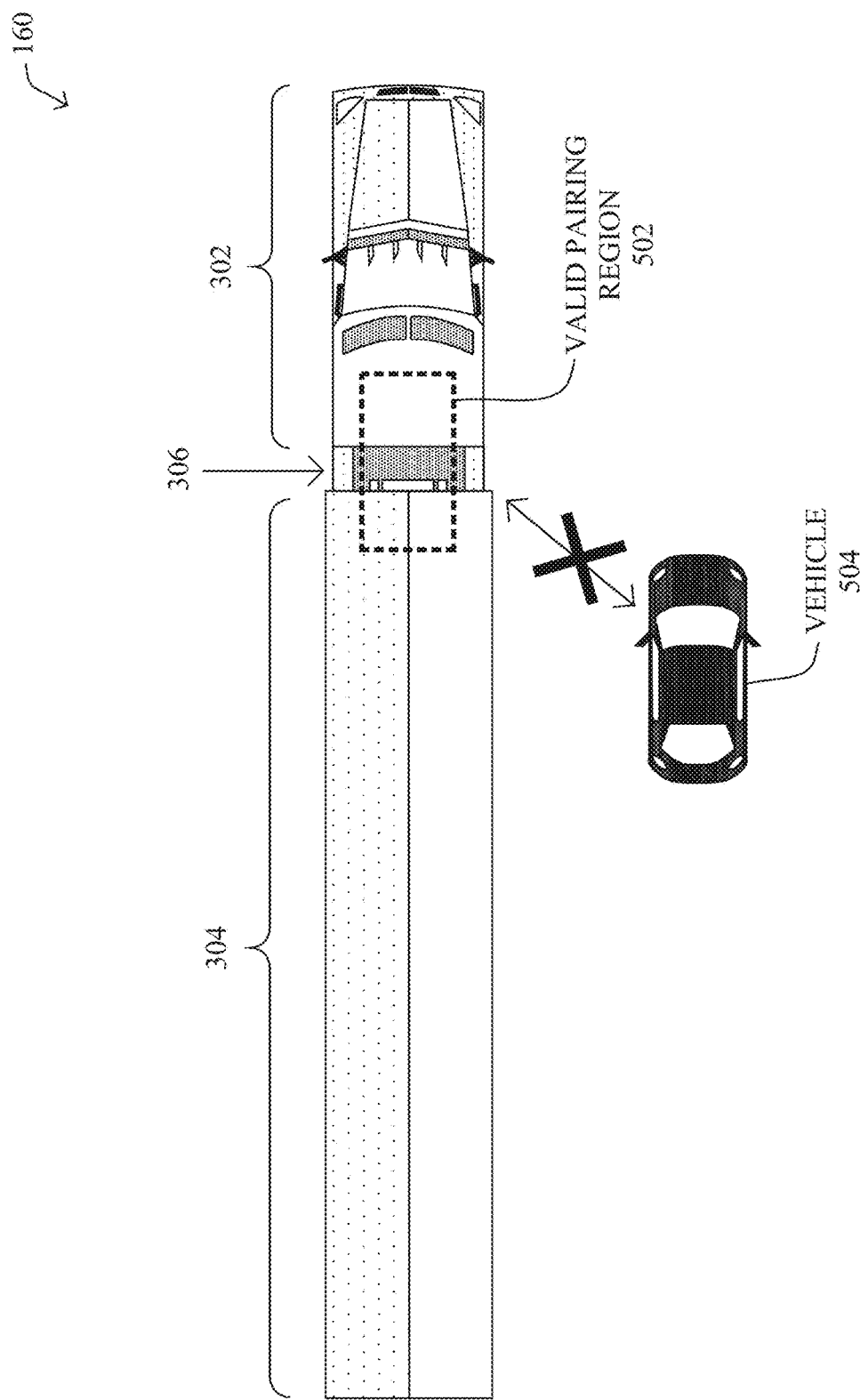
FIG. 5 illustrates an example of limiting the Wi-Fi pairing range and direction for a trailer.

FIG. 5 illustrates an example of limiting the Wi-Fi pairing range and direction for a trailer. Assume, for example, that tractor unit 302 and trailer 304 are equipped with multi-antenna Wi-Fi transceivers, which can be used to communicate with other access points in the yard and for other purposes. In such cases, in various embodiments, these transceivers can be used to restrict the wireless pairing/provisioning between tractor unit 302 and trailer 304 to a specific range and/or direction. For example, a rogue device operating near a truck rest area, dock, warehouse, etc., may attempt to connect with either of trailer 304 or tractor unit 302.

In further cases, a malicious entity may attempt to connect with trailer 304 or tractor unit 302 while driving alongside vehicle 160. For example, as shown, if tractor unit 302 and trailer 304 are connected via physical cabling 306, their corresponding Wi-Fi transceivers may only connect with one another within a valid pairing region 502. Thus, if another entity, such as vehicle 504 attempts to connect with the Wi-Fi of either trailer 304 or tractor unit 302, the connection attempt may be blocked based on vehicle 504 being located outside of valid pairing region 502 (e.g., based on the estimated direction and distance to vehicle 504).

Figure 6:
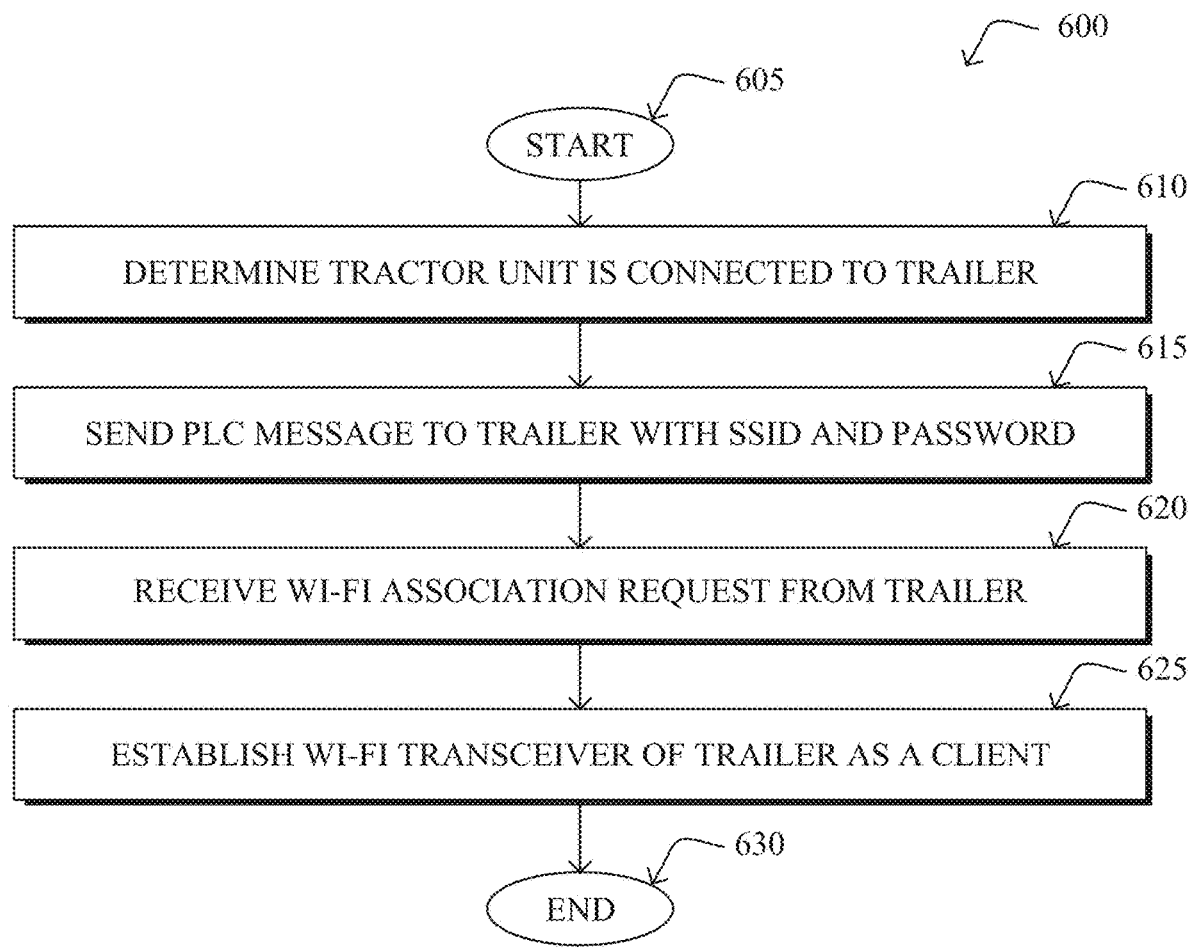
FIG. 6 illustrates an example simplified procedure for pairing the Wi-Fi of a tractor unit to a trailer.

Said differently, the range (e.g., based on signal strength) and direction associated with a received association request can be used to further ensure that trailer 304 only associates with the Wi-Fi of tractor unit 302 and vice-versa. For tractor unit 302, this means that the pairing direction would be directly behind it and for trailer 304, the pairing direction will be directly in front of it. Thus, if the received signal is from any other direction, the attempted connection may be blocked. In some cases, tractor unit 302 may report the blocked connection to the supervisory service. FIG. 6 illustrates an example simplified procedure for pairing the Wi-Fi of a tractor unit to a trailer in a network in accordance with one or more embodiments described herein. For example, a non-generic, specifically configured device (e.g., device 200), such as a device of a tractor unit, may perform procedure 600 by executing stored instructions (e.g., process 248). The procedure 600 may start at step 605, and continues to step 610, where, as described in greater detail above, the device may determine that the tractor unit is connected to a trailer via physical cabling. For example, the cabling may be J560 cabling or other ISO standard cabling. In various embodiments, the device may determine that the tractor unit is connected to the trailer based on a signal from a magnetic or mechanical switch mounted to the cabling, NFC circuitry associated with the cabling, or even via detection of a PLC signal on the cabling.

At step 615, as detailed above, the device may send, via the physical cabling, a PLC message to the trailer that includes a service set identifier (SSID) and password for a Wi-Fi transceiver of the tractor unit. Such a transceiver may be integrated directly into the device or, alternatively, be in communication therewith.

At step 620, the Wi-Fi transceiver of the tractor unit receives an association request sent wirelessly from a Wi-Fi transceiver of the trailer that is based on the sent SSID and password, as described in greater detail above. In addition, in some cases, the trailer may also send an identifier, such as a MAC address, for its Wi-Fi transceiver that can be used to prevent other Wi-Fi transceiver from associating with the transceiver of the tractor unit as clients. Such an identifier can also be sent by the tractor unit to an Internet-based service to verify that the correct trailer was attached to the tractor unit (e.g., by matching a location, timestamp, and trailer ID to expected values).

At step 625, as detailed above, the device may establish the Wi-Fi transceiver of trailer as a Wi-Fi client of the Wi-Fi transceiver of the tractor unit. Once paired, the Wi-Fi transceiver of the trailer may send a communication to the Wi-Fi transceiver of the tractor unit and, in turn, forward the communication on to the Internet via an external interface of the tractor unit, such as a cellular or satellite transceiver. Procedure 600 then ends at step 630.

Figure 7:
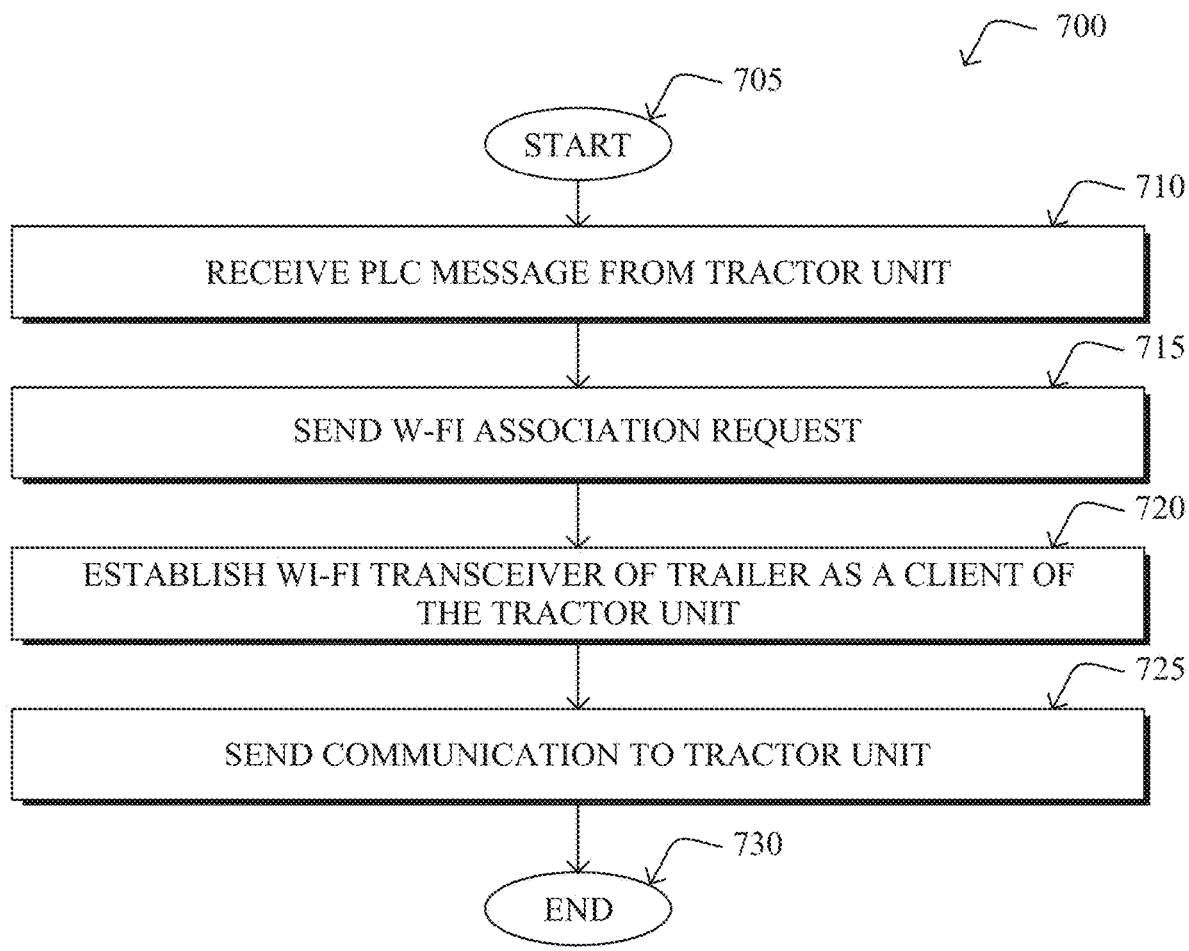
FIG. 7 illustrates an example simplified procedure for pairing the Wi-Fi of a trailer to a tractor unit.

FIG. 7 illustrates an example simplified procedure for pairing the Wi-Fi of a trailer to a tractor unit, according to various embodiments. For example, a non-generic, specifically configured device (e.g., device 200), such as a device of a trailer, may perform procedure 700 by executing stored instructions (e.g., process 248). The procedure 700 may start at step 705, and continues to step 710, where, as described in greater detail above, the device may receive, via physical cabling connecting the trailer to a tractor unit, a PLC message that includes an SSID and password for a Wi-Fi transceiver of the tractor unit.

At step 715, as detailed above, a Wi-Fi transceiver of the trailer may send an association request to the Wi-Fi transceiver of the tractor unit that is based on the received SSID and password. Such a transceiver of the trailer may be integrated directly into the device or be in communication therewith. In some embodiments, the device may also send an identifier for the Wi-Fi transceiver of the trailer to the tractor unit (e.g., a MAC address or other identifier). This can be used, for example, for purposes of ensuring that the tractor unit is coupled to the right trailer and the like.

At step 720, the Wi-Fi transceiver of trailer is established as a Wi-Fi client of the Wi-Fi transceiver of the tractor unit, as described in greater detail above. In other words, the Wi-Fi transceiver of the tractor unit may operate as an access point for the Wi-Fi transceiver of the trailer.

At step 725, as detailed above, a wireless communication may be sent from the Wi-Fi transceiver of the trailer to the Wi-Fi transceiver of the tractor unit. In some embodiments, the tractor unit may transmit the communication via the Internet to a destination. For example, the communication may include sensor data from the trailer that is reported to an Internet-based monitoring service. Conversely, the Wi-Fi transceiver of the tractor unit may also forward a communication from the Internet to the Wi-Fi transceiver of the trailer, such as a query, control command, etc. Procedure 700 then ends at step 730.

It should be noted that while certain steps within procedures 600-700 may be optional as described above, the steps shown in FIGS. 6-7 are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Moreover, while procedures 600-700 are described separately, certain steps from each procedure may be incorporated into each other procedure, and the procedures are not meant to be mutually exclusive.

The techniques described herein, therefore, allow for the Wi-Fi pairing of a trailer to a tractor unit without requiring any additional intervention by a user. In some aspects, the techniques herein also provide additional security measures over existing approaches, by ensuring that the correct trailer is connected to the correct tractor unit.

While there have been shown and described illustrative embodiments that provide for the automatic provisioning of Wi-Fi for trailers, it is to be understood that various other adaptations and modifications may be made within the spirit and scope of the embodiments herein. For example, while certain embodiments are described herein with respect to provisioning a trailer to the Wi-Fi of a tractor unit, the techniques herein are not limited as such and can be used for other forms of transportation vehicles, as well. In addition, while certain protocols are shown, such as Wi-Fi, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
   determining, by a device of a tractor unit, that the tractor unit is connected to a trailer via physical cabling, wherein the physical cabling forms a connection between a powerline communication (PLC) module of the tractor unit and a PLC module of the trailer, wherein the PLC modules enable PLC communications between the tractor unit and trailer over the physical cabling;
   sending, by the device and via the PLC communications, a PLC message to the trailer that includes a service set identifier (SSID) and password for a Wi-Fi transceiver of the tractor unit;
   receiving, at the Wi-Fi transceiver of the tractor unit, an association request sent wirelessly from a Wi-Fi transceiver of the trailer that is based on the sent SSID and password;
   establishing, by the device, the Wi-Fi transceiver of the trailer as a Wi-Fi client of the Wi-Fi transceiver of the tractor unit;
   receiving, at the device of the tractor unit, a PLC message from the trailer that includes an identifier for the Wi-Fi transceiver of the trailer;
   verifying, at the device of the tractor unit and using the received identifier, that the trailer is correctly established to the tractor unit based on an external Internet-based service; and
   using, by the device, the received identifier to prevent spoofed Wi-Fi transceivers from joining the Wi-Fi transceiver of the tractor unit as clients.

2. The method as in claim 1, further comprising:
   receiving, at the Wi-Fi transceiver of the tractor unit, a communication from the Wi-Fi transceiver of the trailer; and
   transmitting the received communication via the Internet to a destination.

3. The method as in claim 2, wherein the received communication is transmitted via a cellular transceiver of the tractor unit.

4. The method as in claim 1, wherein the physical cabling is J560 cabling.

5. The method as in claim 1, wherein the identifier for the Wi-Fi transceiver of the trailer comprises a media access control (MAC) address.

6. The method as in claim 1, further comprising:
sending an indication of the received identifier, a timestamp, and location information to an Internet-based service.

7. The method as in claim 1, wherein the PLC message is sent to the trailer in response to the tractor unit starting.

8. The method as in claim 1, wherein determining that the tractor unit is connected to the trailer via the physical cabling comprises:
receiving a signal from a switch mounted to the cabling.

9. A method, comprising:
receiving, at a device of a trailer and via powerline communication (PLC) communications enabled by a connection formed between a PLC module of the trailer and a PLC module of a tractor unit over physical cabling connecting the trailer and the tractor unit, a PLC message that includes a service set identifier (SSID) and password for a Wi-Fi transceiver of the tractor unit;
sending, by a Wi-Fi transceiver of the trailer, an association request to the Wi-Fi transceiver of the tractor unit that is based on the received SSID and password;
establishing the Wi-Fi transceiver of the trailer as a Wi-Fi client of the Wi-Fi transceiver of the tractor unit;
sending a wireless communication from the Wi-Fi transceiver of the trailer to the Wi-Fi transceiver of the tractor unit, wherein the tractor unit transmits the communication via the Internet to a destination; and
sending a PLC message from the trailer that includes an identifier for the Wi-Fi transceiver of the trailer, wherein the Wi-Fi transceiver of the tractor unit verifies, using the sent identifier, that the trailer is correctly established to the tractor unit based on an external Internet-based service and prevents spoofed Wi-Fi transceivers from joining the Wi-Fi transceiver of the tractor unit as clients.

10. The method as in claim 9, wherein the physical cabling is J560 cabling.

11. The method as in claim 9, wherein the identifier for the Wi-Fi transceiver of the trailer comprises a media access control (MAC) address.

12. An apparatus, comprising:
a powerline communication (PLC) network interface;
a Wi-Fi transceiver;
a processor coupled to the PLC network interface and the Wi-Fi transceiver that is configured to execute one or more processes; and
a memory configured to store a process executable by the processor, the process when executed configured to:
determine that a tractor unit is connected to a trailer via physical cabling, wherein the physical cabling forms a connection between the PLC network interface of the tractor unit and a PLC module of the trailer, wherein the PLC network interface and the PLC module enable PLC communications between the tractor unit and the trailer over the physical cabling;
send, via the physical cabling and the PLC network interface, a PLC message to the trailer that includes a service set identifier (SSID) and password for the Wi-Fi transceiver of the apparatus;
receive, at the Wi-Fi transceiver of the apparatus, an association request sent wirelessly from a Wi-Fi transceiver of the trailer that is based on the sent SSID and password;
establish, by the apparatus, the Wi-Fi transceiver of the trailer as a Wi-Fi client of the Wi-Fi transceiver of the apparatus;
receive, by the apparatus, a PLC message from the trailer that includes an identifier for the Wi-Fi transceiver of the trailer;
verify, using the received identifier, that the trailer is correctly established to the tractor unit based on an external Internet-based service; and
use the received identifier to prevent spoofed Wi-Fi transceivers from joining the Wi-Fi transceiver of the tractor unit as clients.

13. The apparatus as in claim 12, wherein the process when executed is further configured to:
receive, at the Wi-Fi transceiver of the apparatus, a communication from the Wi-Fi transceiver of the trailer; and
transmit the received communication via the Internet to a destination.

14. The apparatus as in claim 13, wherein the received communication is transmitted via a cellular transceiver of the tractor unit.

15. The apparatus as in claim 12, wherein the apparatus determines that the tractor unit is connected to the trailer via physical cabling by exchanging PLC-based keepalive packets with the trailer.

16. The apparatus as in claim 12, wherein the process when executed is further configured to:
block an association request based on a range or direction associated with the blocked association request relative to the Wi-Fi transceiver.

17. The apparatus as in claim 12, wherein the apparatus determines that the tractor unit is connected to the trailer via the physical cabling by:
receiving a signal from a switch mounted to the cabling.

* * * * *